Jan. 31, 1967   O. W. CRAIG   3,302,062
SOLID STATE OVERLOAD PROTECTION MEANS FOR POWER CIRCUITS
Filed Oct. 22, 1963   2 Sheets-Sheet 2
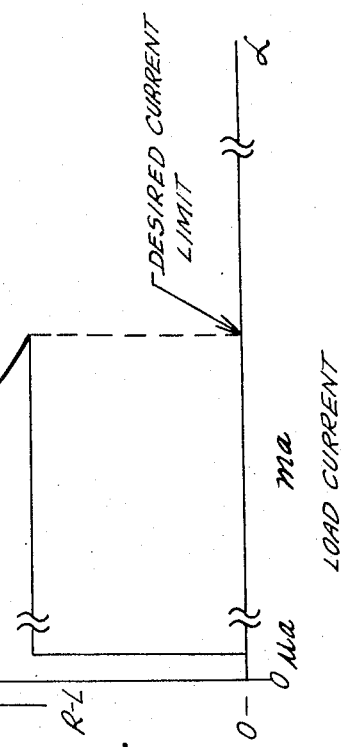
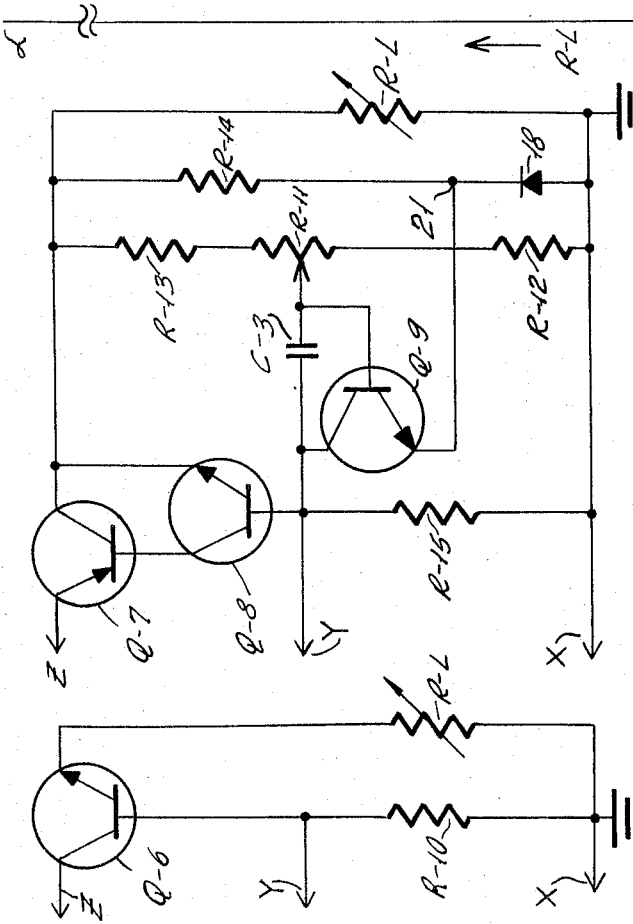
INVENTOR.
ORLYN W. CRAIG
BY
Raymond R. Skolnick

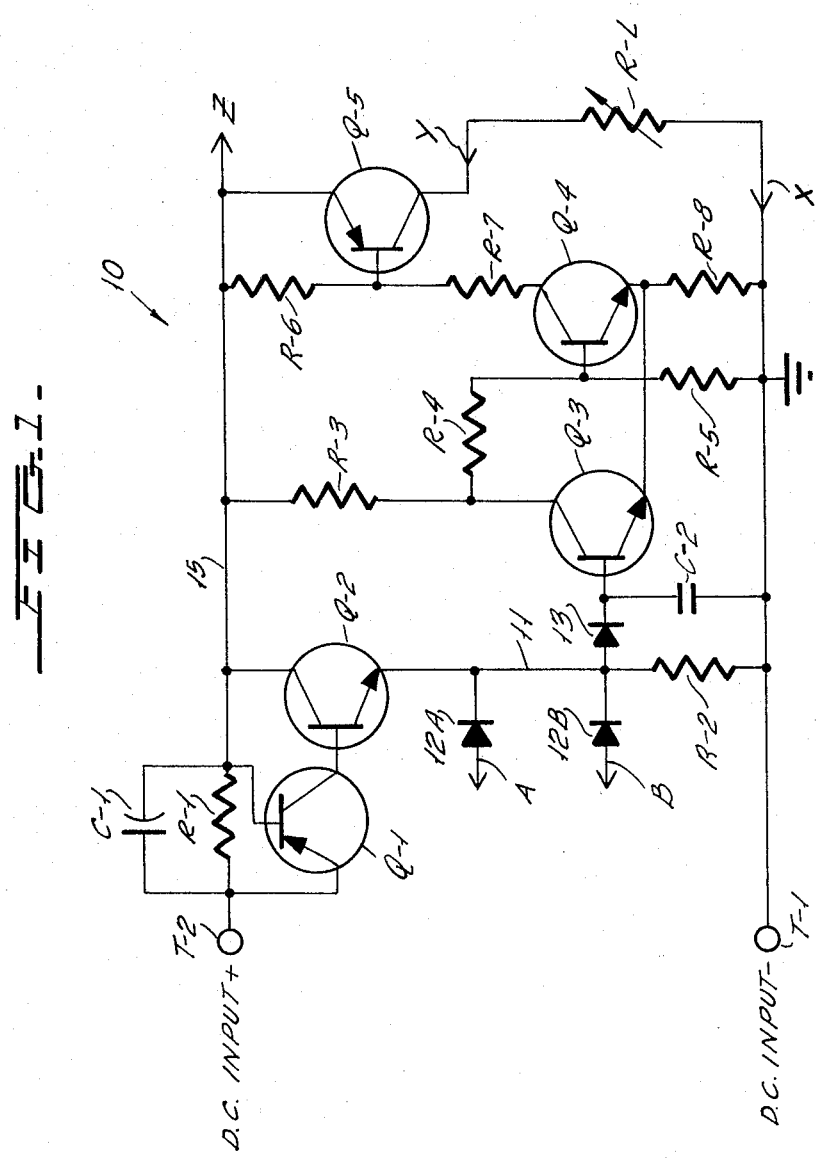

United States Patent Office 3,302,062
Patented Jan. 31, 1967

3,302,062
SOLID STATE OVERLOAD PROTECTION MEANS FOR POWER CIRCUITS
Orlyn W. Craig, Bristol, Tenn., assignor to Sperry Rand Corporation, Sperry Farragut Company Division, Bristol, Tenn., a corporation of Delaware
Filed Oct. 22, 1963, Ser. No. 317,993
6 Claims. (Cl. 317—22)

This invention relates to circuit overload protective devices in general and more particularly relates to a static protection circuit for D.C. power systems which automatically restores the system to normal operation when the fault condition has been cleared.

In addition to circuit protective devices having separable contacts the power art has, for the most part, utilized fuses and current limiting arrangements to protect power systems from overload conditions. Separable contact devices, because they rely upon the movement of mechanical elements, are relatively slow acting. Fuses require auxiliary circuits in order to achieve fast action and are particularly objectionable in that fuses must be replaced in order to restore service.

Current limiting methods of the prior art limit the current to a maximum value somewhere below the maximum power dissipation rating of the semi-conductors used for current limiting. Prior art arrangements of this type are unsatisfactory for extended overload periods for high power applications or for systems having limited power capacity since the power dissipated in the semi-conductors is essentially the product of D.C. supply voltage and the short circuit current which is higher than normal load current. Thus, under short circuit conditions the power dissipated in the semi-conductors is many times that dissipated under normal load conditions. Accordingly, prior art current limiting arrangements utilizing semi-conductors have proven satisfactory only for low voltage low current applications.

As will hereinafter be explained in detail, the protection circuit of the instant invention is of such a construction that power dissipated in the circuit is very low during normal operations and is even less during overload or short circuit conditions. Further, its application is not limited to circuits of low power dissipation.

Accordingly a primary object of this invention is to provide a novel overload and short circuit protection circuit.

Another object is to provide an arrangement of this type which automatically resumes normal operation upon removal of the overload or short circuit and is adaptable to a wide range of D.C. voltages and load currents.

Still another object is to provide a protection circuit of this type which will protect against a short circuit condition indefinitely without damage.

A further object is to provide an overload protection circuit of this type which may be activated by a current overload sensing element in any part of the equipment operated by the power source.

A still further object is to provide an overload protection circuit of this type which is automatically resetting and in which the power dissipated in the protection elements is very low during normal operation and is even less during overload or short circuit conditions.

These as well as further objects of this invention shall become readily apparent after reading the following description of the accompanying drawings in which:

FIGURE 1 is an electrical schematic illustrating an overload protection circuit constructed in accordance with the teachings of the instant invention.

FIGURE 2 is an electrical schematic showing elements for modifying the circuit of FIGURE 1 to provide protection for loads having higher current requirements.

FIGURE 3 is an electrical schematic showing elements for modifying the circuit of FIGURE 1 to produce a regulated voltage across the load.

FIGURE 4 is a graph showing the characteristic curve for the overload protection circuit of FIGURE 1.

Now referring to the figures and more particularly to FIGURE 1. Overload protection system 10 includes PNP transistor Q–1 and Q–5 as well as NPN transistors Q–2, Q–3 and Q–4 connected in a manner to be hereinafter described in detail. Electrical load R–L is connected from grounded negative input terminal T–1 through transistor Q–5 and overload sensing resistor R–1 to the positive input terminal T–2 of system 10.

Resistor R–1 is connected across the emitter-base circuit of Q–1 with the emitter being connected to positive input terminal T–2. The collector of Q–1 is connected directly to the base of Q–2 while the collector of Q–2 is connected to the terminal of resistor R–1 remote from positive terminal T–2 and also to bus 15. Line 11 connects the emitter of Q–2 through resistor R–2 to negative input terminal T–1. Secondary input terminals A and B are connected through semi-conductor diodes 12A and 12B, respectively, to line 11 for a purpose to be hereinafter explained.

Line 11 is connected through diode 13 to the base of Q–3 which is connected through capacitor C–2 to the negative input terminal T–1. The collector of Q–3 is connected through resistor R–3 to bus 15 and through resistor R–4 to the base of Q–4 with the latter being connected through resistor R–5 to negative input terminal T–1. The emitters of Q–3 and Q–4 are connected through resistor R–8 to negative input terminal T–1 while the collector of Q–4 is connected through resistors R–7 and R–6 to bus 15 with the base of Q–5 being connected to the juncture between resistors R–6 and R–7. The emitter of Q–5 is connected to bus 15 while the collector of Q–5 is connected through load R–L to the negative input terminal T–1.

When D.C. input power of indicated polarity is applied at input terminals T–1 and T–2, Q–4 and Q–5 are biased into a state of conduction with Q–5 offering little resistance to current flow through load R–L so that the voltage appearing across load R–L is approximately the same value as the input voltage across terminals T–1 and T–2. Overload sensing resistor R–1 acts as a low resistance current shunt across the emitter-base junction of Q–1. Overloads and short circuits are sensed by resistor R–1, the value of which determines the load current cutoff point so that the value of resistor R–1 must be selected in conjunction with other circuit parameters.

At the cutoff point, Q–1 and Q–2 are biased sufficiently into conduction to allow the voltage drop across resistor R–2 to reach the value required to trigger Q–3 into conduction. With Q–3 conducting, Q–4 ceases conduction thereby removing the bias from Q–5 so that the impedance from emitter to collector of Q–5 rises to a very high value. Thus, the voltage across load R–L drops to substantially zero so that load current is cut off except for negligible leakage current through Q–5.

The trigger voltage developed across resistor R–2 charges capacitor C–2 through diode 13. The discharge circuit for capacitor C–2 is through resistor R–8 and the emitter-base junction of Q–3 resulting in a relatively slow discharge so that conduction of Q–3 is maintained over a significant period of time after the voltage across R–2 is removed with Q–5 remaining nonconducting for this period.

After a sufficient portion of the charge on capacitor C–2 has leaked off, Q–3 ceases to conduct while Q–4 and Q–5 resume conduction so that the impedance presented to load current by Q–5 goes to a very low value. If the fault causing the overload condition has cleared normal operation resumes. However, if the fault persists the overload or short circuit will again be detected by resistor R–1 and the cutoff operation previously described will again take place.

In a typical protection system 10 the transistor types and circuit element values are listed below.

| | | |
|---|---|---|
| R–1 | ohms | 5 |
| R–2 | do | 1200 |
| R–3 | do | 4300 |
| R–4 | do | 1000 |
| R–5 | do | 1500 |
| R–6 | do | 330 |
| R–7 | do | 4300 |
| R–8 | do | 1000 |
| C–1 | mfd | 0.1 |
| C–2 | mfd | 40 |
| Q–1 | | 2N1026 |
| Q–2 | | 2N497 |
| Q–3 | | 2N335 |
| Q–4 | | 2N335 |
| Q–5 | | 2N1609 |

A circuit of this type energized by a 28 volt D.C. source was adjusted to cut off at 96.6 ma., or when load R–L was decreased to 284 ohms or less. As load R–L decreased in 1 ohm steps the load current dropped from 96.5 ma. at 285 ohms load to 0.1 ma. at 283 ohms load and less, including a short across load R–L. The "on" pulses were of 10 microsecond durations and the "off" periods were 110 milliseconds. FIGURE 4 illustrates the characteristic curve for overload protection circuit 10.

The "off" time is somewhat dependent upon load R–L particularly near the cutoff point, where cutoff occurs before capacitor C–2 can be fully charged. This condition arises in the absence of transistor Q–2. Under this condition the on-off time is variable and random and the average load current may be any fraction of the cutoff current. By adding transistor Q–2 as shown, this type of condition occurs only when load R–L is within 2 ohms of the cutoff point. Q–2 serves to speed up cutoff action when load R–L is just below the cutoff value, and may be omitted if sharp cutoff is not required.

Capacitor C–1, shown connected in parallel with overload sensing resistor R–1, is required only if the D.C. line is noisy. Noise or spikes if frequent enough, will allow a charge to accumulate on capacitor C–2 and cause random triggering. Capacitor C–1 bypasses noise and spikes so as to eliminate random triggering.

Positive pulses, generated in other circuits energized by the source applied at terminals T–1 and T–2, may be applied at secondary terminals A and B and when so applied will have the same effect as an overload current flowing through resistor R–1. Protection circuit 10 hereinabove described essentially comprises an overload sensing element R–1; a trigger generator Q–1, Q–2 and R–2; a storage device C–2 for trigger signals; an amplifier Q–3 and Q–4 together with associated resistors actuated by the trigger signals and a variable impedance element Q–5 in series with the electrical load.

For higher power applications the protection circuit 10 of FIGURE 1 may be modified by connecting the elements of FIGURE 2 into the circuit of FIGURE 1 in the following manner. Load R–L, connected between circuit points designated X and Y in FIGURE 1, is removed and replaced by the elements arranged as shown in FIGURE 2 with circuit points designated X, Y and Z in FIGURE 2 being connected to correspondingly designated points in the circuit of FIGURE 1. In FIGURE 1, point X is grounded, point Y is connected to the collector of Q–5 and point Z is connected to bus 15. Q–6 is an NPN type power transistor whose collector is connected to bus 15. Load R–L is connected from ground to the emitter of Q–6 while the base of Q–6 is connected to point Y. Resistor R–10 is connected between points X and Y.

With the protection system of FIGURE 1 modified by adding the elements of FIGURE 2 as previously described, when Q–5 is in a conducting state Q–6 also conducts and when Q–5 is cut off Q–6 is also cut off. Thus, it is seen that Q–6 is the variable impedance element in series with load R–L.

FIGURE 3 shows a grouping of elements for a modification of the circuit of FIGURE 1 to produce a regulated D.C. output voltage. Points designated X, Y and Z in FIGURE 3 are connected to points similarly designated in the circuit of FIGURE 1. Q–7 is a PNP type transistor while Q–8 and Q–9 are NPN type resistors. Load R–L is connected to bus 15. Zener diode 18 is connected from ground through current limiting resistor R–14 to the collector of Q–7 and provides a reference voltage at circuit point 21. Potentiometer R–11 is in series with resistors R–12 and R–13 to form a voltage divider extending from ground to the collector of Q–7.

The emitter of Q–9 is connected directly to circuit point 21 while the base of Q–9 is connected to the movable arm of potentiometer R–11. Filter capacitor C–3 is connected between the movable arm of potentiometer R–11 and the collector of Q–9 with the latter being connected to circuit point Y as are the base of Q–8 and resistor R–15 which extends to ground. The emitter of Q–8 is connected to the collector or Q–7 while the collector of Q–8 is connected to the base of Q–7.

In a manner well-known to the art, Zener diode 18 provides a substantially fixed reference voltage with respect to ground for the emitter of regulator transistor Q–9. The position of the movable arm of potentiometer R–11 determines the potential on the base of Q–9 thereby controlling the conduction level of Q–9 as well as those conduction levels of Q–8 and Q–7 to set the normal operating potential existing across load R–L. In the embodiment of FIGURE 3, Q–7 acts as the variable impedance element in series with load R–L.

Thus, this invention provides a novel protection circuit in which the power dissipated during normal operation is very low and decreases to an even lower value during overload or short circuit conditions. This protection circuit construction is such that normal operation will resume automatically when the overload or short circuit condition no longer exists. Further, the protection circuit will protect against a short circuit condition existing for an indefinite period.

Although there has been described a preferred embodiment of this novel invention, many variations and modifications will now be apparent to those skilled in the art. Therefore, this invention is to be limited, not by the specific disclosure herein, but only by the appending claims.

I claim:

1. A circuit of the type described including voltage input terminals; a first circuit connected between said terminals and including an electrical load, a variable impedance means, and an overload sensing means; said variable impedance means including a semi-conductor device comprising an emitter, a base, and a collector; said base being connected to said amplifier; said overload sensing means including a resistor; said resistor, said collector, said emitter and said load being connected in series and constituting a portion of said first circuit; a generator for producing a trigger signal; said generator connected to and actuated by said overload sensing means upon the occurrence of an overload current condition; an amplifier and means connecting said trigger generator in circuit with said amplifier; means connecting said amplifier to said impedance means in a manner such that a trigger signal produced by said generator upon the occurrence of an overload current condition is fed through said amplifier to raise the impedance of said variable impedance means from a normal relatively low range to a relatively high range thereby clearing said overload current condition and essentially deenergizing said load; a storage means charged by said trigger signal and maintaining said trigger signal applied at said amplifier for a predetermined time interval after said overload current condition has cleared thereby maintaining said variable impedance means at said relatively high range of impedance during said time interval; means, including part of another semi-conductor device of said amplifier, constituting a leakage path connected to said storage means for discharge thereof whereby the trigger signal at said amplifier will diminish during said time interval after which said variable impedance means will drop in impedance to said relatively low range and will remain in this range so long as the fault causing said overload current condition is not present, with the load being reenergized while said impedance means is at said relatively low range.

2. A circuit as set forth in claim 6 also including a voltage regulator separate from said overload sensing means and said trigger generator; said voltage regulator connected to said variable impedance means for controlling impedance level thereof in said relatively low range independently of impedance control affected by said amplifier whereby a substantially constant voltage is maintained across said load when the impedance level is in said relatively low range.

3. A circuit as set forth in claim 1 also including a voltage regulator separate from said overload sensing means and said trigger generator; said voltage regulator connected to said variable impedance means for controlling impedance level thereof in said relatively low range independently of impedance control affected by said amplifier whereby a substantially constant voltage is maintained across said load when the impedance level is in said relatively low range.

4. A circuit as set forth in claim 1 in which the trigger generator includes a resistor across which said trigger signal is developed; said storage means including a capacitor at the input to said amplifier; and means connecting said capacitor across said resistor.

5. A circuit as set forth in claim 4 in which the means connecting said capacitor across said resistor includes a diode series connected between said capacitor and said resistor; said diode arranged in circuit for passage of a charge to said capacitor and for the blocking of capacitor discharge through said resistor.

6. A circuit as set forth in claim 5 in which said another semi-conductor device includes a base circuit constituting the input to said amplifier; said base circuit providing a path for the discharge of said capacitor.

References Cited by the Examiner
UNITED STATES PATENTS

| | | | |
|---|---|---|---|
| 3,078,410 | 2/1963 | Thomas | 323—9 X |
| 3,101,441 | 8/1963 | Curry | 317—33 X |
| 3,170,088 | 2/1965 | Coutsourakis | 317—22 |
| 3,192,441 | 6/1965 | Wright | 317—33 |
| 3,235,787 | 2/1966 | Gordon et al. | 317—22 X |

MILTON O. HIRSHFIELD, *Primary Examiner.*

R. V. LUPO, *Assistant Examiner.*